(12) United States Patent
Bell

(10) Patent No.: US 9,726,272 B2
(45) Date of Patent: Aug. 8, 2017

(54) ASSEMBLY FOR ADJUSTABLY MOUNTING A GEAR OF A PUMP TO A GEAR OF A DRIVER EQUIPMENT

(71) Applicant: Electro-Motive Diesel, Inc., LaGrange, IL (US)

(72) Inventor: Stuart Bell, Chicago Heights, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 374 days.

(21) Appl. No.: 14/488,369

(22) Filed: Sep. 17, 2014

(65) Prior Publication Data

US 2016/0076635 A1    Mar. 17, 2016

(51) Int. Cl.
| | |
|---|---|
| *F16H 57/12* | (2006.01) |
| *F04B 39/12* | (2006.01) |
| *F04C 15/00* | (2006.01) |
| *F16H 57/022* | (2012.01) |
| *F04C 29/00* | (2006.01) |

(52) U.S. Cl.
CPC ....... *F16H 57/022* (2013.01); *F04C 15/0061* (2013.01); *F04C 29/005* (2013.01); *F16H 57/12* (2013.01); *F04B 39/12* (2013.01); *F16H 2057/0222* (2013.01); *F16H 2057/125* (2013.01)

(58) Field of Classification Search
CPC ............ F16H 1/26; F16H 2057/02021; F16H 57/021; F16H 2057/0216; F16H 2057/0222; F16H 57/022; F16H 57/023; F16H 57/12; F16H 2057/125; F04B 9/02; F04B 35/01; F04B 39/12; F04B 39/121; F04B 39/128; F04B 53/16; F04C 11/008; F04C 15/0061; F04C 29/005; F04C 2240/30; F04D 29/40
USPC ........ 74/395, 397, 11, 15.6, 15.63; 417/373, 417/423.11, 423.14; 418/107, 206.6, 132, 418/206.1, 205; 403/238, 240, 337, 199
See application file for complete search history.

(56) References Cited

U.S. PATENT DOCUMENTS

| 3,502,059 | A | * | 3/1970 | Davis ........................ F01L 1/02 |
|---|---|---|---|---|
| | | | | 123/195 R |
| 3,597,115 | A | | 8/1971 | Jass et al. |
| 4,068,740 | A | | 1/1978 | Quinn et al. |
| 4,096,836 | A | * | 6/1978 | Kopich ..................... F01L 1/34 |
| | | | | 123/90.15 |
| 5,540,112 | A | * | 7/1996 | Baker ................... F16H 57/022 |
| | | | | 74/397 |

(Continued)

FOREIGN PATENT DOCUMENTS

GB    2391596    2/2004

*Primary Examiner* — William Kelleher
*Assistant Examiner* — Bobby Rushing, Jr.

(57) ABSTRACT

An assembly for adjustably mounting a gear of a pump to a gear of a driver equipment includes a shroud member, and a hollow elongated stub-shaft. The stub-shaft includes a flange, and a hub member axially extending from the flange. The shroud member defines a first aperture whose diameter is greater than a diameter of the hub member. The hub member is received within the shroud member via the first aperture. The flange has a first set of holes to receive a first set of fasteners and releasably couple with the body of the pump. The flange also has a second set of holes that are configured to receive a second set of fasteners and releasably couple with the shroud member. A diameter of the second set of holes is greater than a diameter of the second set of fasteners.

19 Claims, 6 Drawing Sheets

(56) References Cited

U.S. PATENT DOCUMENTS

| | | | |
|---|---|---|---|
| 6,247,377 B1 * | 6/2001 | Long | F16H 55/18 |
| | | | 123/90.31 |
| 6,644,939 B2 | 11/2003 | Vukovich et al. | |
| 6,808,374 B2 | 10/2004 | Phallen et al. | |
| 6,872,161 B2 | 3/2005 | Dicarlo | |
| 8,555,838 B2 | 10/2013 | Petry-Johnson et al. | |
| 9,157,508 B2 * | 10/2015 | Allgaier | F16H 1/203 |
| 2012/0238390 A1 * | 9/2012 | Ishizuka | F16H 57/027 |
| | | | 475/159 |
| 2013/0039746 A1 * | 2/2013 | Kurihara | F04D 17/122 |
| | | | 415/124.1 |

* cited by examiner

ASSEMBLY FOR ADJUSTABLY MOUNTING A GEAR OF A PUMP TO A GEAR OF A DRIVER EQUIPMENT

TECHNICAL FIELD

The present disclosure generally relates to an assembly for adjustably mounting a gear of a pump to a gear of a driver equipment. More particularly, the present disclosure relates to an assembly that allows adjustment in backlash of the gears of the pump and the driver equipment or an adjacent accessory gear.

BACKGROUND

Typically, pumps are connected to various types of prime movers or driver equipment such as engines and electric motors in order to be driven for the pumping of a fluid. In most cases, pumps are provided with a gear wheel that is meshed with a gear of the prime mover. However, in some cases, for e.g., during initial fitment of the pump onto the prime mover, or during installation of the pump at a later time, it may be required to adjust or re-adjust a backlash between the gears of the pump and the prime mover. Numerous systems have been developed in the past to drive a pump, for e.g., an oil pump of an engine. Some systems even include gearing systems to transmit power from a prime mover to the pump.

For reference, U.S. Pat. No. 6,872,161 (hereinafter referred to as '161 patent) discloses a modular gear system for transmitting power from a motor to a device such as a pump. In a single-stage mode, the system may implement a first gearset assembly within its gearbox to produce a rotational speed adjustment between the shafts of the pump and the motor. Optionally, the system may implement a multi-stage mode wherein both the first and second gearset assemblies are received in the gearbox and are connected in series to produce a different rotational speed adjustment.

Although, the system disclosed in the '161 patent provides flexibility for different speed and power requirements to suit a variety of motors and pumps, the system does not disclose any means of adjusting an amount of engagement between the gears of the pump and the motor.

Therefore, there is a need for a system that allows adjustment in the amount of engagement between the gears of the pump and the prime mover so that the engagement can be optimum and accomplish a smooth operation of the gears.

SUMMARY OF THE DISCLOSURE

In one aspect, the present disclosure discloses an assembly for adjustably mounting a gear of a pump to a gear of a driver equipment. The assembly includes a shroud member, and a hollow elongated stub-shaft. The stub-shaft includes a flange, and a hub member axially extending from the flange. The shroud member defines a first aperture on a first sidewall that is disposed proximal to a body of the pump. A diameter of the first aperture is greater than a diameter of the hub member. The hub member is received within the shroud member via the first aperture. The flange has a first set of holes to receive a first set of fasteners and releasably couple with the body of the pump. The flange also has a second set of holes extending therethrough. The second set of holes is configured to receive a second set of fasteners and releasably couple the flange with the shroud member. A diameter of the second set of holes is greater than a diameter of the second set of fasteners.

In another aspect, the present disclosure discloses an assembly for adjustably mounting a gear of a pump to a gear of a driver equipment. The pump has a shaft and a body configured to partially receive the shaft therein. The assembly includes a shroud member defining a first aperture on a first sidewall that is disposed proximal to the body of the pump. The assembly further includes a hollow elongated stub-shaft including a flange, and a hub member axially extending from the flange. The flange is releasably coupled to the first sidewall of the shroud member. The hub member axially extends from the flange to be received within the shroud member via the first aperture. Moreover, the hub member is disposed about the shaft to define an elongated annular space therebetween.

The assembly further includes a stub-gear including a collar, and a gear wheel disposed at a free end of the collar. The collar is disposed in the elongated annular space and rotatably connected to the hub member. The collar is further coupled to the shaft of the pump to rotate in unison with the shaft. Moreover, the collar is fastened to a thrust plate held in abutment with an end face of the hub member. The gear wheel is adapted to mesh with the gear of the driver equipment. A position of the gear wheel relative to the gear of the driver equipment is adjustable in a plane parallel to the first sidewall.

Other features and aspects of this disclosure will be apparent from the following description and the accompanying drawings.

DETAILED DESCRIPTION

Figure 1:
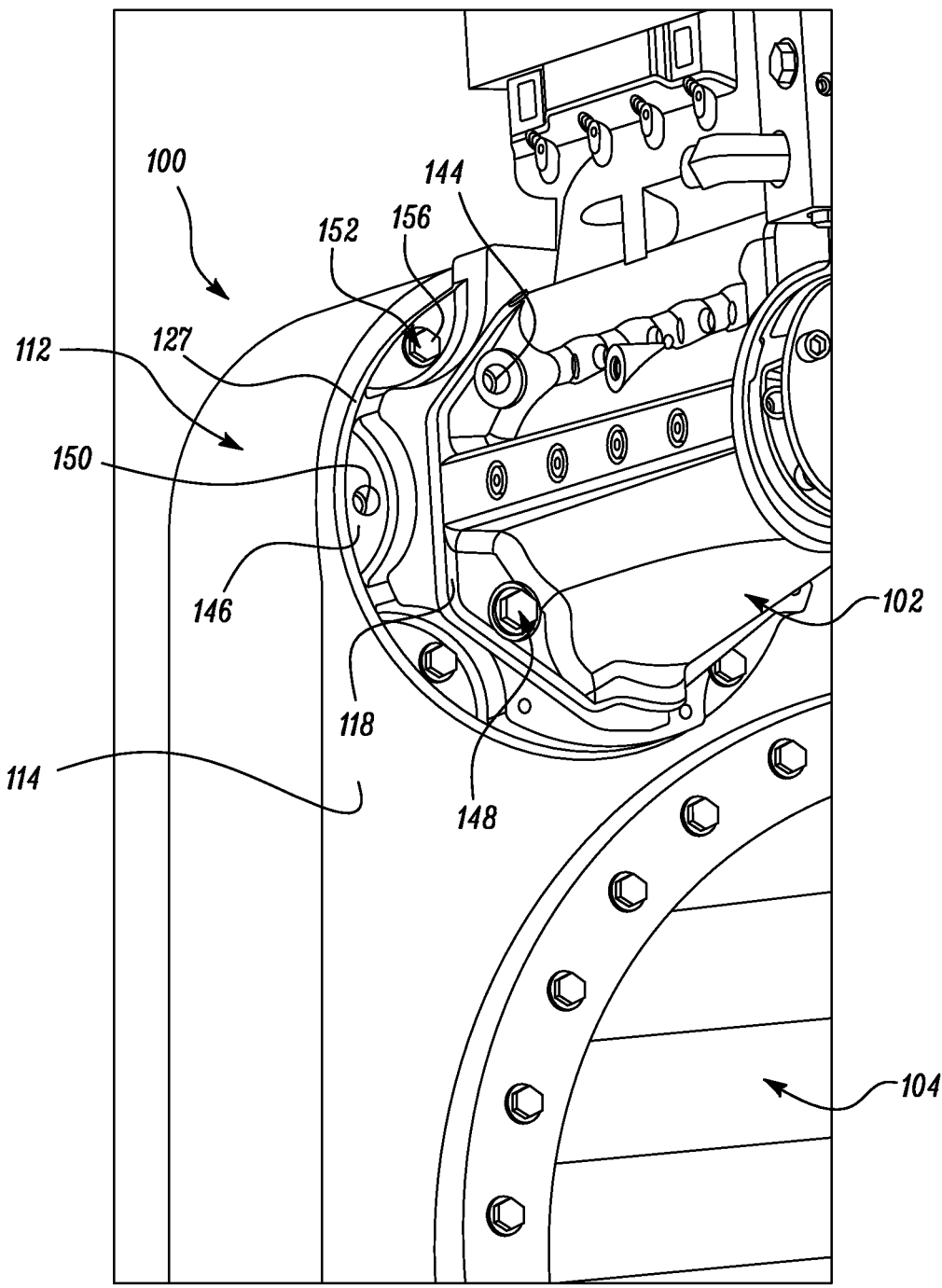
FIG. 1 is a rear perspective view of an assembly in accordance with an embodiment of the present disclosure, employed to adjustably mount an exemplary pump to an exemplary driver equipment.

The present disclosure relates to an assembly for adjustably mounting a gear of a pump to a gear of a driver equipment. FIG. 1 illustrates a rear perspective view of an assembly 100 in accordance with an embodiment of the present disclosure. The assembly 100 is used to adjustably mount a pump 102 to a driver equipment 104. In one embodiment, the pump 102 may embody a reciprocating pump, for example, a piston pump. In another embodiment, the pump 102 can be a rotary pump, for example, a gerotor pump, or a vane pump. Therefore, any type of pump known to one of ordinary skill in the art may be employed to realize various embodiments disclosed herein.

In an embodiment, the driver equipment 104 may be an engine configured to combust fuel and generate power from the combustion process. In one embodiment, the driver equipment 104 may be a gasoline engine. In another embodiment, the driver equipment 104 may be a diesel engine. In yet another embodiment, the engine may be of a type configured to burn natural gas. Alternatively, the driver equipment 104 may be embodied in the form of an electric motor that is configured to generate power from electricity.

Although various types of driver equipment and pumps are disclosed herein, it should be noted that the type or configuration of the driver equipment 104 and the pump 102 is merely exemplary and non-limiting of this disclosure. One of ordinary skill in the art will acknowledge that embodiments of the present disclosure can be equally applied to various other types of driver equipment and pumps known in the art without deviating from the spirit of the present disclosure.

Figure 2:
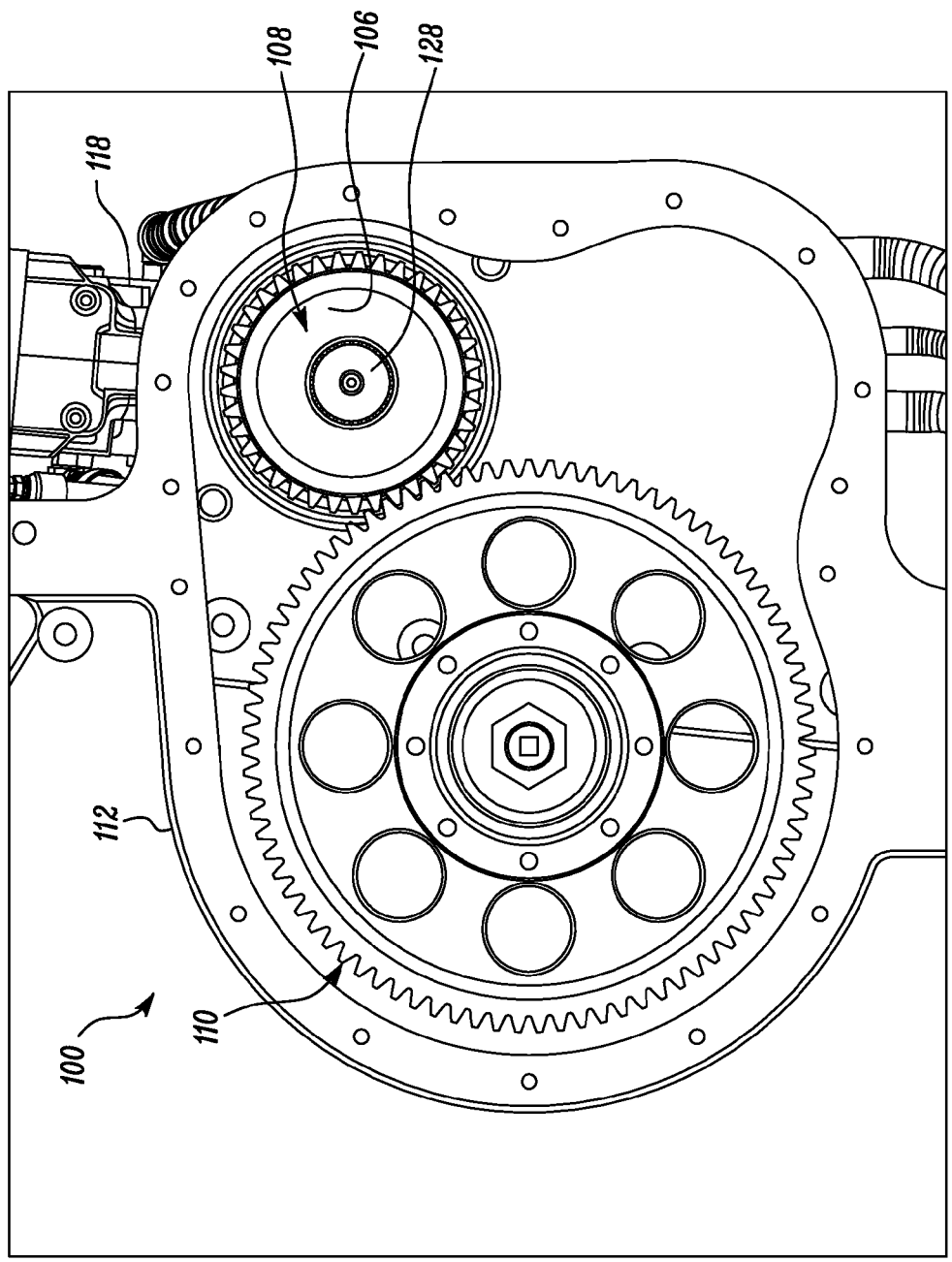
FIG. 2 is a front view showings gears of the exemplary pump and driver equipment of FIG. 1.

Referring to FIG. 2, the assembly 100 includes a gear wheel 106 associated with the pump 102. The gear wheel 106 is disposed in mesh with a gear 110 of the driver equipment 104. The gear wheel 106 may beneficially form part of a stub gear 108, explanation to which will be made later in this document.

Although the gear wheel 106, as depicted in FIG. 2, is disposed in direct mesh with the gear 110 of the driver equipment 104, it may be optionally contemplated to provide additional and/or auxiliary gears, for e.g., idler gears, that are intermeshed with both gears 106, 110 to transmit power from the gear 110 of the driver equipment 104 to the gear wheel 106. As known to one skilled in the art, such additional and/or auxiliary gears may beneficially provide a step-reduction or an increase in the gear-transmission ratio between the two gears 110, 106. Moreover, such additional and/or auxiliary gears may optionally be provided to accommodate and/or compensate for specific physical requirements and/or other space constraints encountered in a given application.

Figure 3:
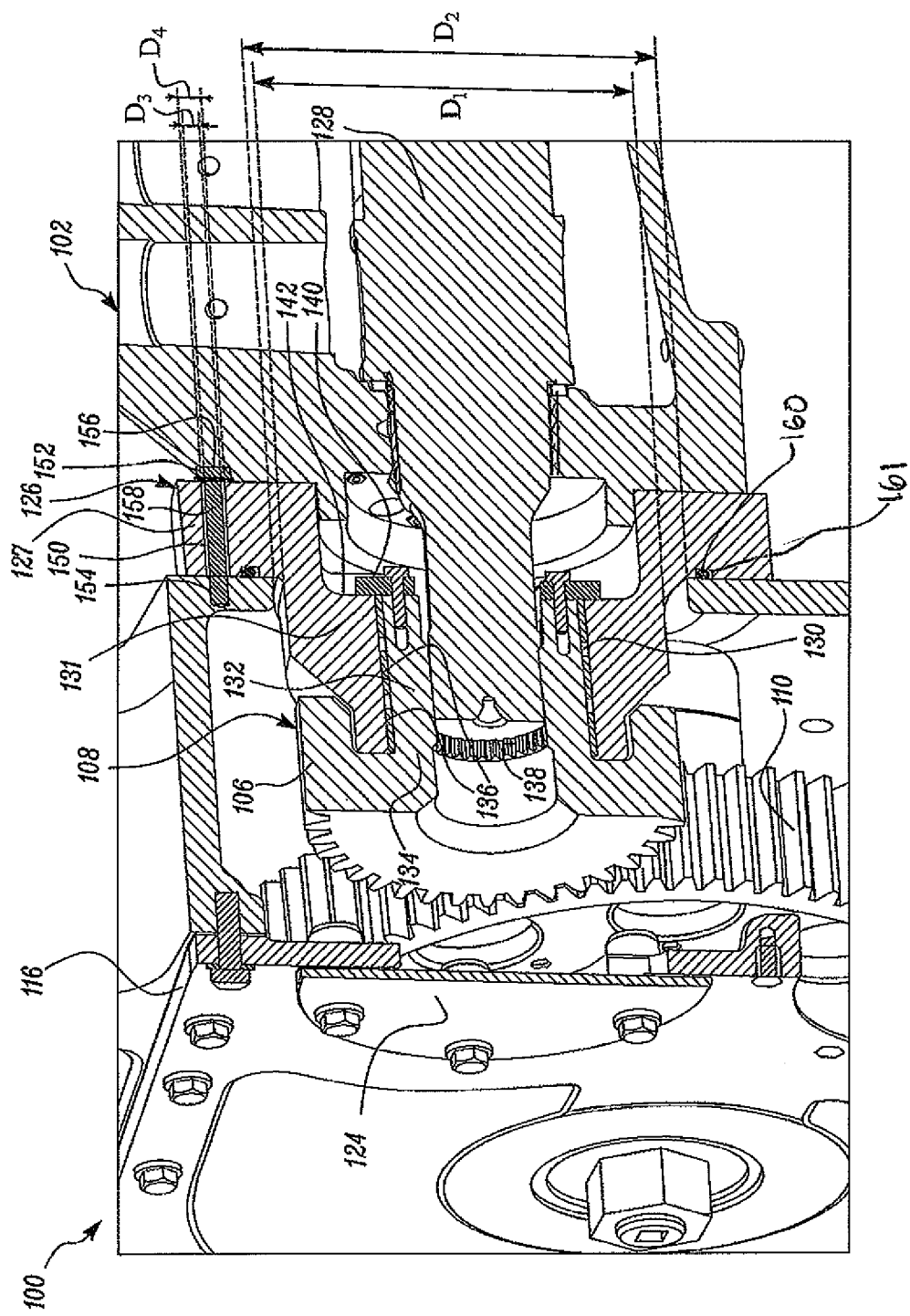
FIG. 3 is a sectional view of the assembly taken along A-A' of FIG. 2, the sectional view showing a cover plate disposed in front of the gear associated with the exemplary pump of FIG. 2.

Referring to FIGS. 1, 2, and 3, the assembly 100 includes a shroud member 112 having a first sidewall 114 and a second sidewall 116. The first sidewall 114 is disposed proximal to a body 118 of the pump 102. The first sidewall 114 defines a first aperture 120 extending therethrough. The first aperture 120 together with the first sidewall 114 allows an adjustable mounting of the pump 102 to the shroud member 112 as will be explained later in this document.

With continued reference to FIGS. 1, 2, and 3 and as best shown in FIG. 3, the second sidewall 116 is spaced apart from the gear wheel 106 of the pump 102 and disposed in an opposing relation to the first sidewall 114. Referring to FIGS. 2 and 3, in an embodiment, the second sidewall 116 of the shroud member 112 may be detachable from a remainder of the shroud member 112, i.e., the second sidewall 116 can be coupled to or uncoupled from the remainder of the shroud member 112 depending on specific requirements of an application. As such, the detachable configuration of the second sidewall 116 may assist one in the initial mounting of the gears 110, 106 to the respective shafts of the driver equipment 104 and the pump 102.

With continued reference to FIG. 3, the second sidewall 116 defines a second aperture 122 extending therethrough. The second aperture 122 may be sized and/or shaped to allow passage of one or more hands of service personnel therethrough. Moreover, the assembly 100 also includes a cover plate 124 that is releasably coupled to the second sidewall 116. This cover plate 124 is located adjacent to the second aperture 122 and hence, configured to cover the second aperture 122. During a service function or an overhaul routine, the service personnel may remove the cover plate 124 from the second sidewall 116 of the shroud member 112 in order to access the gears 110, 106 of the driver equipment 104 and the pump 102.

Figure 4:
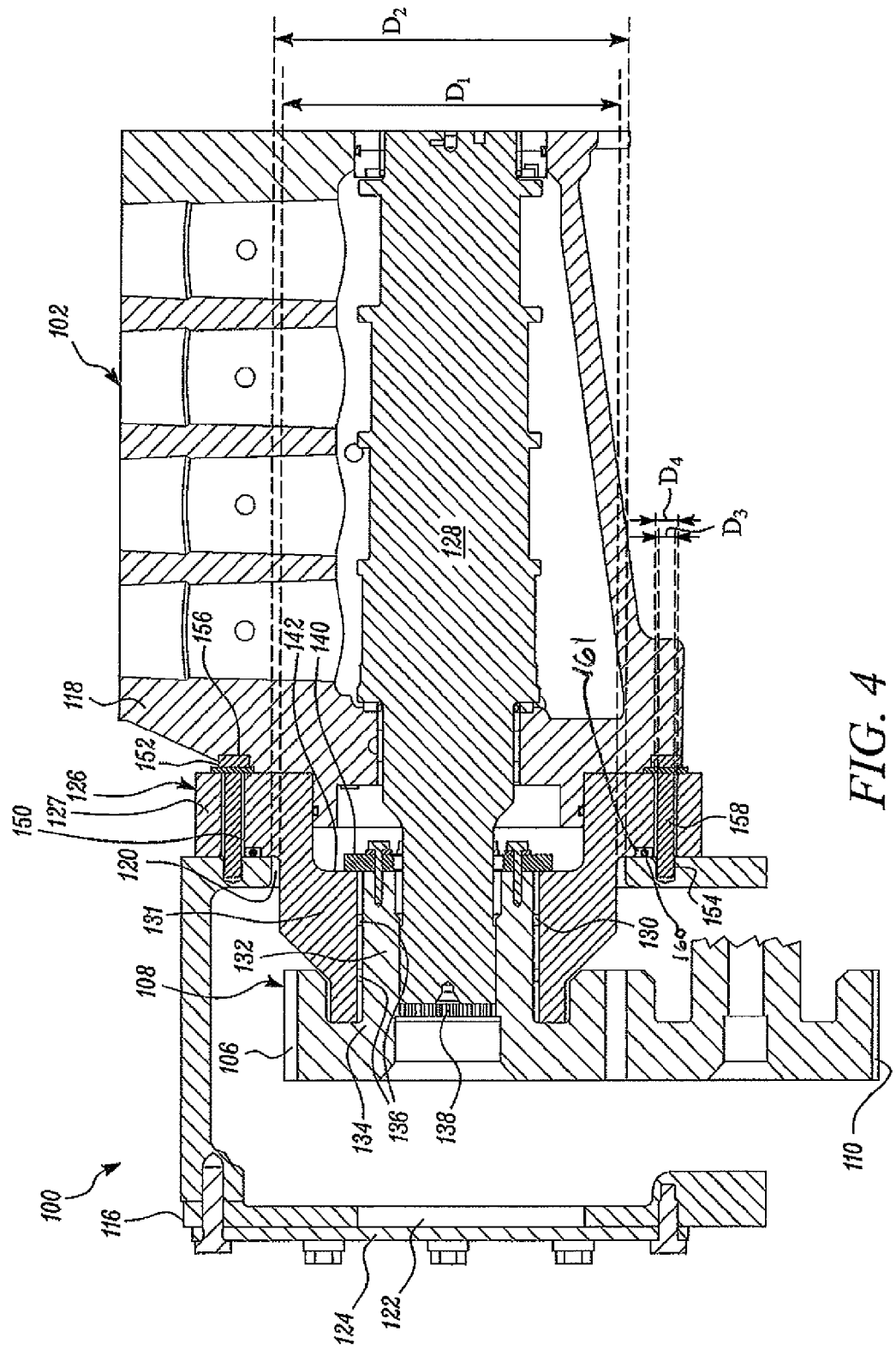
FIG. 4 is a side sectional view of the assembly taken along A-A' of FIG. 2, the side sectional view showing the arrangement and relative sizes of various components therein.

Referring now to FIGS. 3 and 4, the assembly 100 further includes the hollow elongated stub-shaft 126 having a flange 127 and a hub member 131 axially extending from the flange 127. The elongated stub-shaft 126 is partially disposed within the shroud member 112 i.e., with the hub member 131 being received within the shroud member 112 via the first aperture 120 while the flange 127 is located outside of the shroud member 112. The hub member 131 is disposed about a shaft 128 of the pump 102 to define an elongated annular space 130 therebetween.

The assembly 100 further includes the stub gear 108 which includes a collar 132 and the gear wheel 106. The gear wheel 106 is disposed at a free end 134 of the collar 132. In various embodiments of the present disclosure, it is beneficially contemplated to integrally form the gear wheel 106 and the collar 132 so that the gear wheel 106 can form part of the stub gear 108. The collar 132 of the stub-gear is disposed in the elongated annular space 130 and rotatably connected to the hub member 131. The rotatable connection between the collar 132 and the hub member 131 may be accomplished with the use of bearings 136.

As shown, the collar 132 is also coupled to the shaft 128 of the pump 102 so as to rotate in unison with the shaft 128. In an embodiment as shown, the rigid coupling of the collar 132 and the shaft 128 is accomplished by interfitting splines 138 defined on an inner surface of the collar 132 and an outer surface of the shaft 128. Alternatively, the collar 132 and the shaft 128 may be coupled with the help of a key and slot arrangement, or other structures commonly known to one skilled in the art.

Moreover, referring to FIGS. 3 and 4, the collar 132 is fastened to a thrust plate 140 that is held in abutment with an end face 142 of the hub member 131. Fastening of the collar 132 to the thrust plate 140 and maintaining the thrust plate 140 in abutment with the end face 142 of the hub member 131 may prevent the stub gear 108 from becoming axially displaced during operation of the pump 102 and the driver equipment 104. Therefore, the gear wheel 106 associated with the pump 102 is maintained co-planar to the gear 110 of the driver equipment 104.

As shown in FIGS. 3 and 4, a diameter $D_1$ of the hub member 131 is lesser than a diameter $D_2$ of the first aperture 120. The diameter $D_2$ of the first aperture 120 may lie in a range of about 1.01 to 1.4 times the diameter $D_1$ of the hub member 131. In one embodiment, the diameter $D_2$ of the first aperture 120 may be 1.05 times the diameter $D_1$ of the hub member 131. In another embodiment, the diameter $D_2$ of the first aperture 120 may be 1.15 times the diameter $D_1$ of the hub member 131. In yet another embodiment, the diameter $D_2$ of the first aperture 120 may be 1.3 times the diameter $D_1$ of the hub member 131. Further explanation to the relative diameters $D_1$, $D_2$ of the hub member 131 and the first aperture 120 will be made later herein.

Turning back to FIG. 1, the flange 127 has a first set of holes 144 defined on a first side 146 thereof. The first set of holes 144 is configured to receive a first set of fasteners 148 therein so that the flange 127 may be releasably coupled with the body 118 of the pump 102. The first set of fasteners 148 may be hex-bolts, as shown. In alternative embodiments, other suitable types of fasteners may be used as the first set of fasteners 148 in lieu of the hex-bolts.

Further, the flange 127 also defines a second set of holes 150 extending therethrough. The second set of holes 150 is configured to receive a second set of fasteners 152 so that the flange 127 can releasably couple with the shroud member 112. In addition to this, as best shown in FIG. 3, the shroud member 112 defines a plurality of threaded receptacles 154 located on the first sidewall 114. The threaded receptacles 154 are disposed about the first aperture 120 and correspond to the second set of holes 150 on the flange 127. The threaded receptacles 154 are configured to receive the second set of fasteners 152 for releasably coupling the flange 127 to the shroud member 112.

Referring to FIGS. 3 and 4, the second set of fasteners 152 are hex-bolts having a bolt head 156 and a shank 158 axially extending from the bolt head 156. As best shown in FIG. 3, a diameter $D_3$ of the second set of holes 150 is greater than a diameter $D_4$ of the second set of fasteners 152. Specifically, as the second set of fasteners 152 is illustrated are hex-bolts having shanks 158, the diameter $D_3$ of the second set of holes 150 is greater than a diameter $D_4$ of the respective shank 158 received therein.

In various embodiments of the present disclosure, the relative diameters $D_3$, $D_4$ of the second set of holes 150 with the second set of fasteners 152, and the relative diameter $D_2$, $D_1$ of the first aperture 120 with the hub member 131 is configured to allow an adjustment to the engagement between the gear wheel 106 of the pump 102 and the gear 110 of the driver equipment 104. Therefore, a position of the gear wheel 106 relative to the gear 110 of the driver equipment 104 is adjustable in a plane parallel to the first sidewall 114.

Figure 5:
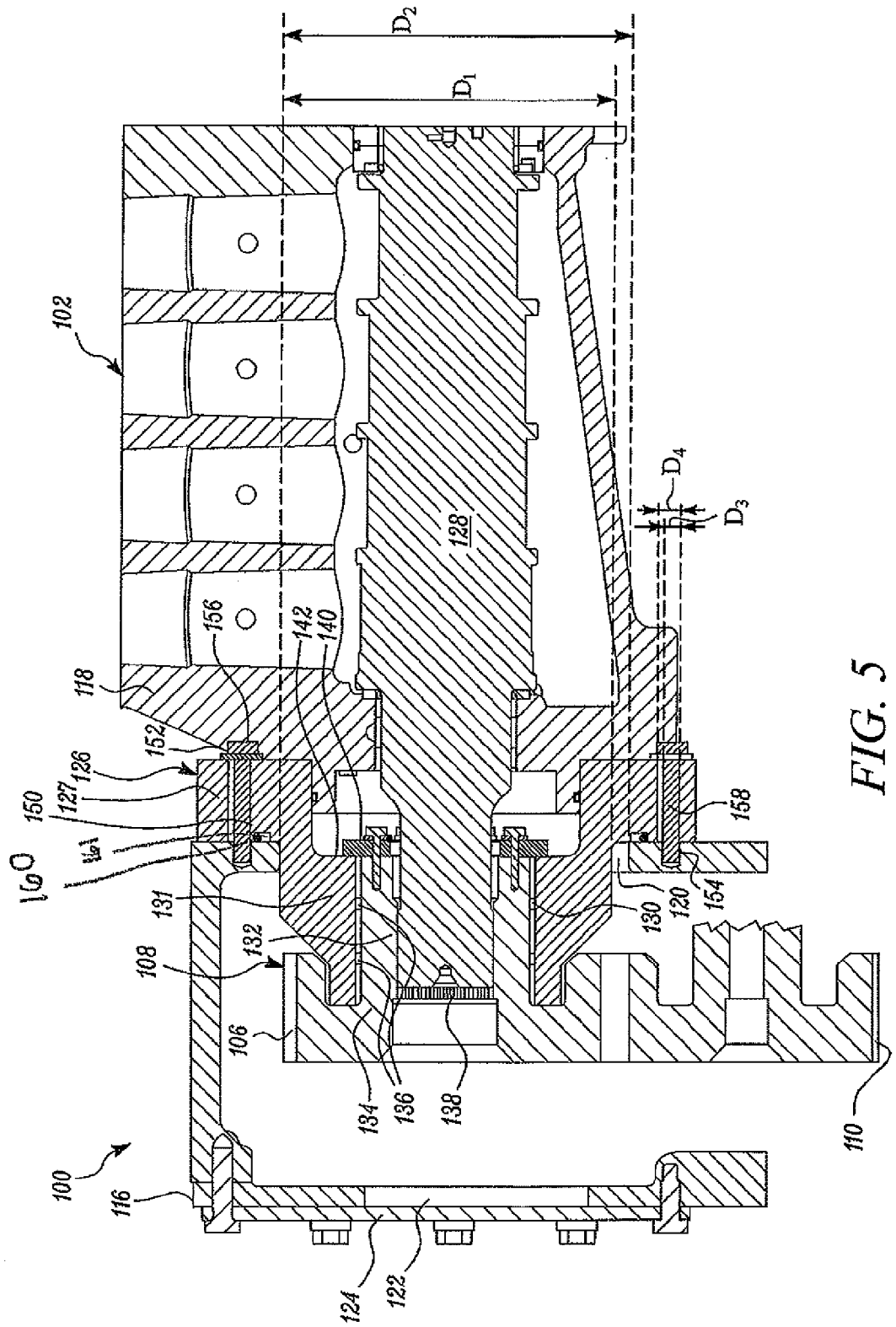
FIGS. 5 and 6 are side sectional views of the assembly showing movement in the gear of the pump relative to the gear of the driver equipment.
Figure 6:
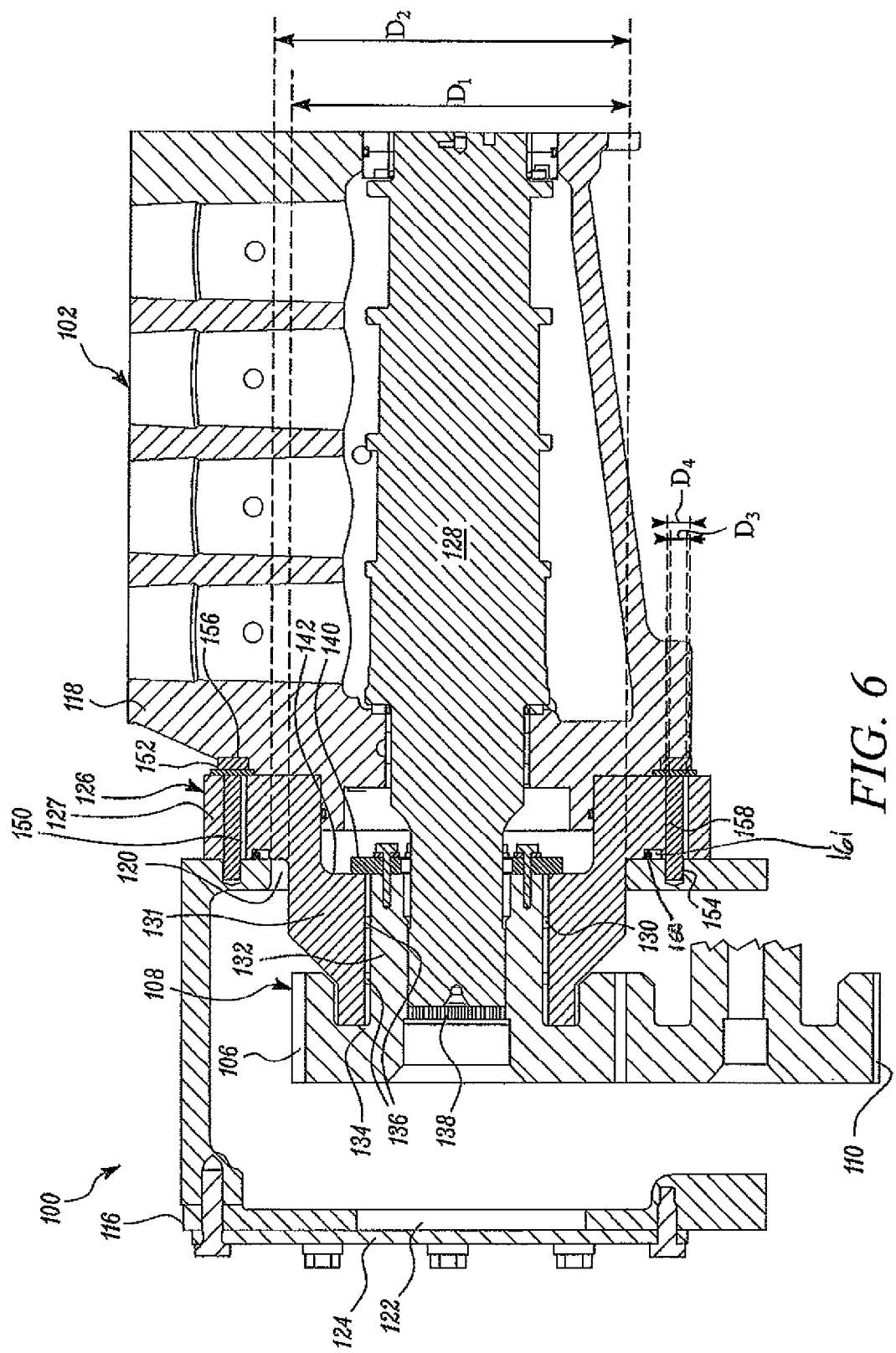

A manner of adjustably varying the position of the gear wheel 106 relative to the gear 110 of the driver equipment 104 will be shown and described in conjunction with FIGS. 4, 5, and 6. In order to bring the gear wheel 106 closer or farther away from the gear 110 of the driver equipment 104, the second set of fasteners 152 may be loosened so as to stay within the threaded receptacles 154 while also freeing up the flange 127 that was earlier held in abutment by the bolt head 156 and the first sidewall 114 of the shroud member 112. As the second set of fasteners 152 require loosening only until the flange 127 held between the bolt head 156 and the first sidewall 114 is slackened enough to execute movement relative to the shroud member 112, the second set of fasteners 152 can still continue to be retained by the threaded receptacles 154 located on the shroud member 112.

Once slackened to the required extent, the flange 127 of the stub-shaft 126 may be physically moved in relation to the shroud member 112. Movement of the flange 127 in relation to the shroud member 112 brings about movement in the gear wheel 106 relative to the gear 110 of the driver equipment 104. This movement may be carried out until an optimum amount of engagement and/or backlash is achieved between the gear wheel 106, and the gear 110 of the driver equipment 104.

Once a desired amount of engagement and/or backlash is achieved between the gear wheel 106, and the gear 110 of the driver equipment 104, the second set of fasteners 152 may be re-tightened to the threaded receptacles 154 provided on the shroud member 112 so that the flange 127 is rendered incapable of movement relative to the shroud member 112. Re-tightening of the second set of fasteners 152 into the threaded receptacles 154 may be carried out until the flange 127 abuts the first sidewall 114 and the bolt heads 156 of the second set of fasteners 152. Such re-tightening of the second set of fasteners 152 ensures that the flange 127 is held in abutment between the body 118 of the pump 102 and the first sidewall 114 of the shroud member 112 and hence, positionally restrained or secured.

Referring to FIG. 5, the assembly 100 is shown at an instant after moving the gear wheel 106 closer to the gear 110 of the driver equipment 104. As shown, the position of the hub member 131 relative to the first aperture 120 is different from that shown in FIG. 4. Similarly, as depicted in FIG. 6, the assembly 100 is shown at an instant after moving the gear wheel 106 farther away from the gear 110 of the driver equipment 104. As shown, the position of the hub member 131 relative to the first aperture 120 is different from that shown in FIGS. 4 and 5.

Additionally, in realizing the embodiments of the present disclosure, it is hereby envisioned that a diameter of the bolt heads 156 from the second set of fasteners 152 are substantially larger than the second set of holes 150 so that the bolt heads 156 can establish an adequate amount of contact area with the flange 127.

However, in an alternative embodiment of the present disclosure, it can also be contemplated to optionally provide one or more washers between the bolt heads 156 of the second set of fasteners 152 and the flange 127. Such washers can be sized large enough so as to accomplish adequate amount of contact area with the flange 127.

The larger sizing of the bolt head 156 and/or the provision of the washer to the second set of fasteners 152 may also decrease a likelihood of the bolt head 156 losing contact area with the flange 127 and/or slipping into the second set of holes 150. Moreover, one of ordinary skill in the art will appreciate that the larger sizing of the bolt head 156 and/or the provision of the washer to the second set of fasteners 152 may facilitate better force of abutment upon tightening of the second set of fasteners 152 into the threaded receptacles 154 of the shroud member 112.

Further, as depicted in FIGS. 3, 4, 5, and 6, the flange 127 may beneficially define an annular groove 161 disposed about the hub member 131. The groove 161 may receive an O-ring 160 that is configured to seal an interface between the flange 127 and first sidewall 114 of the shroud member 112. Such a sealing configuration may beneficially prevent ingress of dust, dirt, and/or other unwanted matter into the shroud member 112.

Various embodiments disclosed herein are to be taken in the illustrative and explanatory sense, and should in no way be construed as limiting of the present disclosure. All directional references (e.g., inward, outward, radial, upper, lower, upward, downward, left, right, leftward, rightward, L.H.S, R.H.S, top, bottom, above, below, vertical, horizontal, clockwise, and counter-clockwise) are only used for identification purposes to aid the reader's understanding of the present disclosure, and may not create limitations, particularly as to the position, orientation, or use of the devices and/or methods disclosed herein. Joinder references (e.g., attached, affixed, coupled, engaged, connected, and the like) are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure has applicability in adjustably mounting a pump 102 to a driver equipment 104. More specifically, the present disclosure has applicability for adjusting an amount of engagement and/or backlash between gears 106, 110 of the pump 102 and the driver equipment 104.

It is commonly known to one skilled in the art that when an amount of engagement between the gear wheel 106 of the pump 102 and the gear 110 of the driver equipment 104 is varied, the backlash between the gear wheel 106 and the gear also varies. Very little backlash can cause wear in the gear wheel 106 and/or the gear 110 while too much backlash can cause poor power transmission from the gear 110 to the gear wheel 106. With use of the assembly 100, the amount of engagement and hence, the backlash between the gear wheel 106 and the gear 110 can be maintained at an optimum value so as to ensure smooth and proper functioning of the intermeshing gears 106, 110.

As the assembly 100 may be used to mount the pump 102 in rotatable engagement with the driver equipment 104 while also allowing one to adjust the amount of engagement and/or backlash between the associated gears 106, 110 easily, the assembly 100 can offer a simplified yet cost-effective solution to manufacturers and/or other functional units of businesses to accomplish the mounting, and adjustment of the backlash and/or engagement between gears 106, 110 of the pump 102 and the driver equipment 104. Moreover, with use of the assembly 100 disclosed herein, service technicians may experience less fatigue and/or difficulty in mounting and/or adjusting the amount of engagement and/or backlash between the gears 106, 110 of the pump 102 and the driver equipment 104.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An assembly for adjustably mounting a gear of a pump to a gear of a driver equipment, the assembly comprising:
   a shroud member defining a first aperture on a first sidewall, the first sidewall disposed proximal to a body of the pump;
   a hollow elongated stub-shaft including:
   a flange having a first set of holes defined on a first side to receive a first set of fasteners and releasably couple the flange with the body of the pump, and a second set of holes extending therethrough, the second set of holes configured to receive a second set of fasteners to releasably couple with the shroud member, wherein a diameter of the second set of holes is greater than a diameter of the second set of fasteners;
   a hub member axially extending from the flange and received within the shroud member via the first aperture, the hub member disposed about a shaft of the pump to define an elongated annular space therebetween, wherein a diameter of the hub member is less than a diameter of the first aperture; and
   a stub-gear comprising a gear wheel and a collar which are integrally formed, wherein the collar is splined to the shaft of the pump.

2. The assembly of claim 1, wherein:
   the collar is disposed in the elongated annular space and is rotatably connected to the hub member, the collar further coupled to the shaft of the pump to rotate in unison with the shaft, wherein the collar is fastened to a thrust plate held in abutment with an end face of the hub member; and
   the gear wheel is disposed at a free end of the collar and adapted to mesh with the gear of the driver equipment.

3. The assembly of claim 2, wherein the relative diameters of the second set of holes with the second set of fasteners and the relative diameter of the first aperture with the hub member is configured to allow an adjustment to the engagement between the gear wheel of the pump and the gear of the driver equipment.

4. The assembly of claim 3, wherein a position of the gear wheel relative to the gear of the driver equipment is adjustable in a plane parallel to the first sidewall.

5. The assembly of claim 1, wherein the diameter of the first aperture is in a range of about 1.01 to 1.4 times the diameter of the hub member.

6. The assembly of claim 1, wherein the shroud member defines a plurality of threaded receptacles located on the first sidewall and disposed about the first aperture.

7. The assembly of claim 6, wherein the plurality of threaded receptacles correspond to the second set of holes on the flange to receive the second set of fasteners for releasably coupling the flange of the stub-shaft to the shroud member.

8. The assembly of claim 7, wherein the second set of fasteners are hex-bolts having a bolt head and a shank axially extending therefrom, and wherein a diameter of the second set of holes is greater than a diameter of the shank received therein.

9. The assembly of claim 1, wherein the shroud member defines a second aperture on a second sidewall, the second sidewall spaced apart from the gear wheel and disposed in an opposing relation to the first sidewall.

10. The assembly of claim 9 further including a cover plate releasably coupled to the second sidewall, the cover plate configured to cover the second aperture.

11. The assembly of claim 1, wherein the flange defines an annular groove disposed about the hub-member, the groove configured to receive an O-ring to seal an interface between the flange and first sidewall of the shroud member.

12. An assembly for adjustably mounting a gear of a pump to a gear of a driver equipment, the pump having a shaft and a body configured to partially receive the shaft therein, the assembly comprising:
   a shroud member defining a first aperture on a first sidewall, the first sidewall disposed proximal to the body of the pump;
   a hollow elongated stub-shaft comprising:
   a flange releasably coupled to the first sidewall of the shroud member; and
   a hub member axially extending from the flange and received within the shroud member via the first aperture, the hub member disposed about the shaft to define an elongated annular space therebetween; and
   a stub-gear comprising:
   a collar disposed in the elongated annular space and rotatably connected to the hub member, the collar further coupled to the shaft of the pump to rotate in unison with the shaft, wherein the collar is fastened to a thrust plate held in abutment with an end face of the hub member; and a gear wheel disposed at a free end of the collar and adapted to mesh with the gear of the driver equipment, wherein a position of the gear wheel relative to the gear of the driver equipment is adjustable in a plane parallel to the first sidewall, wherein the gear wheel and the collar are integrally formed, and wherein the collar is splined to the shaft of the pump.

13. The assembly of claim 12, wherein a diameter of the first aperture is substantially greater than a diameter of the hub member.

14. The assembly of claim 13, wherein the diameter of the first aperture is in a range of about 1.01 to 1.4 times the diameter of the hub member.

15. The assembly of claim 12, wherein the flange includes a first set of holes defined on a first side thereof, the first set of holes are configured to receive a first set of fasteners and releasably couple the flange with the body of the pump.

16. The assembly of claim 12, wherein the flange includes a second set of holes extending therethrough, the second set of holes configured to receive a second set of fasteners to releasably couple with the shroud member.

17. The assembly of claim 16, wherein a diameter of the second set of holes is greater than a diameter of the second set of fasteners.

18. The assembly of claim 12, wherein the shroud member defines a second aperture on a second sidewall, the second sidewall disposed in an opposing relation to the first sidewall.

19. The assembly of claim 18 further including a cover plate releasably coupled to the second sidewall, the cover plate configured to cover the second aperture.

* * * * *